United States Patent [19]

Ikeda

[11] Patent Number: 4,889,297
[45] Date of Patent: Dec. 26, 1989

[54] LIGHT AIRCRAFT FOR SHORT-DISTANCE TAKEOFF AND LANDING

[76] Inventor: Minoru Ikeda, 526-3, Ohishi-machi, Kurume-shi, Fukuoka-ken, Japan

[21] Appl. No.: 267,276
[22] Filed: Nov. 4, 1988
[30] Foreign Application Priority Data Nov. 11, 1987 [JP] Japan ............................ 62-285739

[51] Int. Cl.$^4$ ............................ B64B 1/20; B64C 1/34
[52] U.S. Cl. .................................. 244/5; 244/25; 244/92
[58] Field of Search ............... 244/5, 25, 26, 51, 92, 244/2

[56] References Cited

U.S. PATENT DOCUMENTS

| | | | |
|---|---|---|---|
| 1,418,522 | 6/1922 | Boyle | 244/92 |
| 1,637,133 | 7/1927 | Tew | 244/92 |
| 1,657,955 | 1/1928 | Bylek | 244/26 |
| 1,901,173 | 3/1933 | Kuhn | 244/5 |
| 3,807,661 | 4/1974 | Ikeda | 244/5 |

Primary Examiner—Joseph F. Peters, Jr.
Assistant Examiner—Rodney Corl
Attorney, Agent, or Firm—Oblon, Spivak, McClelland, Maier & Neustadt

[57] ABSTRACT

A light aircraft for short distance takeoff and landing includes an airplane having a propeller provided on a rear pedestal thereof for producing vertical propulsion and an airship having a propeller provided on a rear pedestal thereof for producing vertical propulsion and also having a flight attitude sensor provided within an operating compartment thereof. The flight attitude sensor is always directed in the vertical direction, detects forward and rearward inclinations of the airship, and transmits signals corresponding to the inclinations to the two propellers, thereby rotating the two propellers to produce downward or upward propulsion to maintain the aircraft at the normal horizontal attitude at all times.

3 Claims, 3 Drawing Sheets

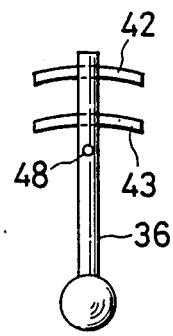
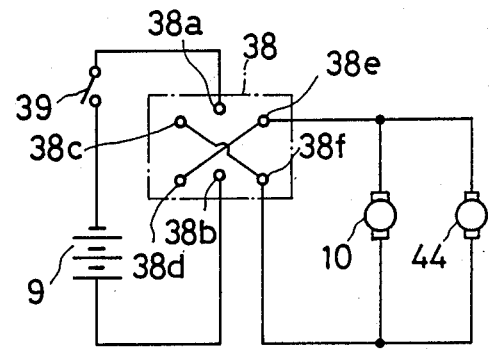
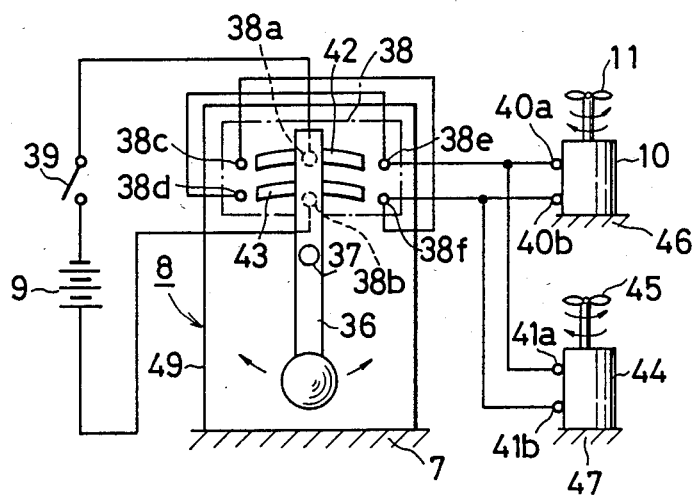
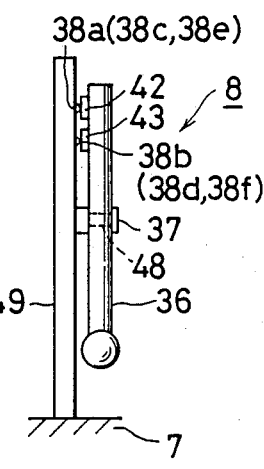

LIGHT AIRCRAFT FOR SHORT-DISTANCE TAKEOFF AND LANDING

BACKGROUND OF THE INVENTION

1. Field of the Invention

The present invention relates to a light aircraft for short-distance takeoff and landing and, more particularly, to an aircraft comprising an airplane and an airship containing a buoyant gas such as helium, excellent in stability and maneuverability during ascending, descending, vertical, circuitous and level flight, and capable of shortening the distance required for the takeoff and landing thereof.

2. Description of the Prior Art

Generally, an airplane is superior in maneuverability and inferior in stability, whereas an airship is superior in stability and inferior in maneuverability. An aircraft comprising an airplane and an airship aims at maximizing the superior qualities and minimizing the inferior qualities of the two types of aircraft. Various kinds of such aircrafts have heretofore been proposed. Generally, a known aircraft takes off by filling a rear ballonet of the airship with air to move the center of the static lifting power of the airship to a front portion of the aircraft and utilizing the propulsion of a propeller of the airplane. This takeoff method results in a flight with an increased angle of attack. This flight requires much time in order for the aircraft to ascend to a given height and results in large drag of the airship, thus lowering the flight efficiency. The term "angle of attack" used herein means the angle formed between the direction of flight and the lengthwise axis of the airship.

The inventor proposed an aircraft comprising an airplane and an ovate balloon filled with a buoyant gas with the aim of enabling safe, stable and yet controllable flight, low consumption of fuel and short takeoff and landing distances (U.S. Pat. No. 3,807,661). This aircraft ascends by utilizing the propulsion of a propeller and the lift of a main plane of the airplane and operating a vertical rudder and elevators, and descends by decelerating the speed of the airplane to lower the lift of the main plane. In fact, this aircraft enjoys stabler maneuverability and shorter distance takeoff and landing due to the presence of the ovate balloon. However, since the balloon is inclined during the flight of the aircraft, the problem of an increased angle of attack which lowers the flight efficiency had not yet been solved.

OBJECT AND SUMMARY OF THE INVENTION

The present invention has been accomplished in view of the drawbacks suffered by conventional aircraft.

The main object of the present invention is to provide a light aircraft for short distance takeoff and landing, capable of attaining substantially vertical takeoff and landing in a short period of time, safe, stable and yet controllable in ascending, descending, vertical, circuitous and level flight, and excellent in flight efficiency.

To achieve the object described above, according to the present invention, there is provided a light aircraft comprising an airplane having a rear pedestal provided with a propeller producing vertical propulsion, and an airship, disposed above the airplane, having a rear pedestal provided with a propeller producing vertical propulsion and also having a gondola provided with a flight attitude sensor always directed in the vertical direction.

When the flight attitude sensor provided in the gondola of the airship is inclined relative to the lengthwise direction of the airship in the counterclockwise direction at the time of takeoff of the aircraft, the propellers provided on the rear pedestals of the airplane and airship are rotated to produce upward propulsion. When the flight attitude sensor is inclined relative to the lengthwise direction of the airship in the clockwise direction at the time of landing of the aircraft, the propellers are rotated to produce downward propulsion. Thus, the aircraft is automatically maintained in a flight attitude to be substantially horizontal at all times. Therefore, safe and stable flight of the aircraft including ascending, descending, vertical, circuitous and level flight can be assured.

The above and other objects, characteristic features and advantages of the present invention will become more apparent to those skilled in the art as the disclosure of the invention is made hereinbelow with reference to the accompanying drawings.

BRIEF DESCRIPTION OF THE DRAWINGS

FIG. 3 is a front view illustrating a pendulum of a flight attitude sensor of the aircraft of FIG. 1.

FIG. 4 is an electric circuit diagram of the flight attitude sensor of FIG. 3.

FIG. 5 is a structural view of the flight attitude sensor of FIG. 3.

FIG. 6 is a side view illustrating the flight attitude sensor of FIG. 5.

DETAILED DESCRIPTION OF THE PREFERRED EMBODIMENT

According to the studies conducted by the inventor, in order to establish an aircraft comprising an airplane and an airship and capable of attaining substantially vertical takeoff and landing at a short distance in a short period of time, safe, stable and yet controllable in ascending, descending, vertical, circuitous and level flight, and excellent in flight efficiency, it is necessary to make the lift of the aircraft as large as possible and to cause the aircraft to have a flight as vertical as possible at the time of takeoff or landing thereof without assuming a flight with an increased angle of attack. Large lift of the aircraft can be obtained by causing the center of the static lifting force of the airship, the center of the dynamic lifting force of the main plane of the airplane and the center of gravity of the aircraft to be always on the same vertical line. An increased angle of attack can be avoided by detecting the flight attitude of the airship at all times and correcting the flight attitude to be substantially horizontal at all times.

The present invention will now be described with reference to the illustrated embodiment.

Figure 1:
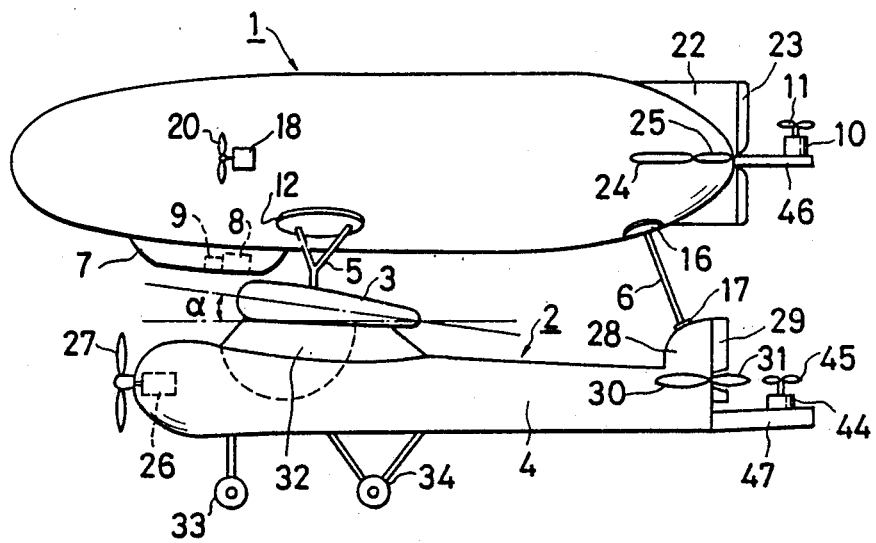
FIG. 1 is a side view illustrating one embodiment of the aircraft according to the present invention.
Figure 2:
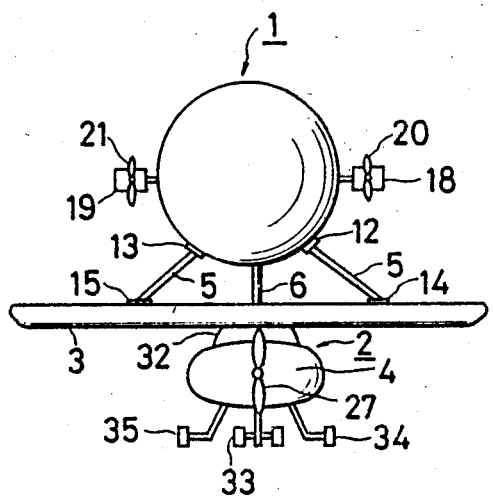
FIG. 2 is a front view illustrating the aircraft of FIG. 1.
Figure 7:
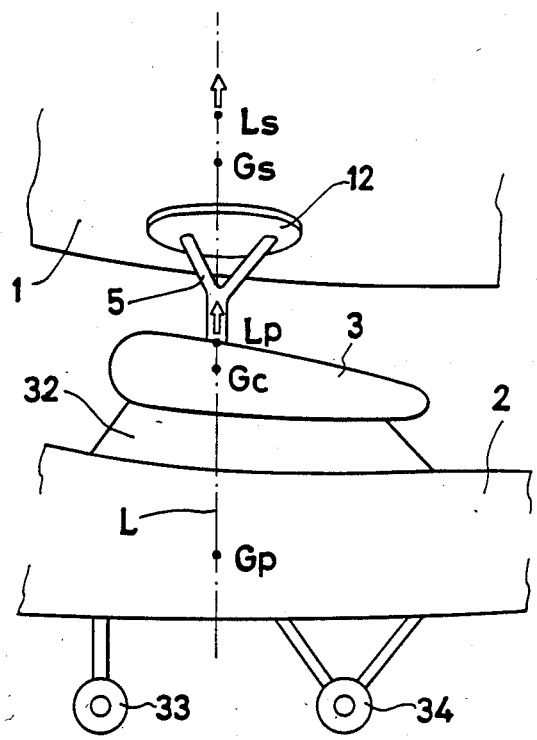
FIG. 7 is an enlarged view showing a principal part of FIG. 1.

As shown in FIGS. 1 and 2, the aircraft of the present invention comprises an airplane 2 and an airship 1. The airplane 2 includes a fuselage 4, a main plane 3 mounted on the fuselage 4 for providing a dynamic lifting force, and an operating compartment 32 located within the fuselage 4 and in which the airplane 2 is controlled. The airship 1 includes an ovate balloon made of a strong light skin such as nylon or polyethylene and filled with a buoyant gas, and a gondola 7 provided on the lower surface of the balloon and in which the airship 1 is controlled. The airship 1 is positioned above the fuselage 4 of the airplane 2 and supported by a pair of right and left side legs 5 and a rear leg 6. The right and left side legs 5 have their upper ends fixed respectively to right and left seat zones 13 and 12 provided on the outer surface of the airship 1 and their lower ends fixed respectively to right and left spars 15 and 14 of the main plane 3 of the airplane 2. The rear leg 6 has its upper end fixed to a rear seat zone 16 provided on the outer surface of the airship 1 and its lower end fixed to a tail section 17 of the fuselage 4 of the airplane 2. The airship 1 and airplane 2 are thus connected by the three legs 5 and 6 so that their lengthwise lines are parallel to each other and so that the center LS of the static lifting force of the airship 1, the center LP of the dynamic lifting force of the main plane 3 of the airplane 2 and the center of gravity Gc of the aircraft are always on the same vertical line L.

The airship 1 is further provided with a rear pedestal 46 on which a vertical DC motor 10 with a propeller 11 producing a vertical force is mounted. The gondola 7 of the airship 1 is provided on the inside bottom thereof with a flight attitude sensor 8 and a DC source 9. The flight attitude sensor 8 and DC source 9 may alternatively be set within the operating compartment 32 of the airplane 2. On the middle outer surface of the airship 1 there are provided right and left propellers 21 and 20 driven respectively by right and left engines 19 and 18 to produce propulsion. On the rear portion of the airship 1, there are provided vertical fins 22, vertical rudders 23, horizontal stabilizers 24 and elevators 25.

The airplane 2 is further provided with a rear pedestal 47 on which a vertical DC motor 44 with a propeller 45 for producing a vertical force is mounted. On the front portion of the airplane 2 there is provided a propeller 27 driven by an engine 26 for producing propulsion and on the rear portion of the same there are provided vertical fins 28, vertical rudders 29, horizontal stabilizers 30 and elevators 31. The airplane 2 is controlled in the conventional manner within the operating compartment 32 located within the fuselage 4. The main plane or wing 3 is equipped with ailerons and flaps (not shown) and mounted on the fuselage 4 at an angle of incidence or angle of attack $\alpha$ between the chord of the main plane and the direction of flight. On the front and middle portions of the airplane 2 under the fuselage 4, there are mounted in the conventional manner a front wheel 33 and right and left main wheels 35 and 34. The airship 1 and airplane 2 are effectively controlled by means of a synchronous control system (not shown).

As illustrated in FIGS. 3 to 6, the flight attitude sensor 8 provided within the gondola 7 has an insulating panel 49 with a metallic pin 37, a reversing "on-off" switch 38, and an insulating pendulum 36 provided at one end thereof with a metallic ball and at the other end thereof with metallic brushes 42 and 43. The metallic pin 37 is inserted into a panel 49 of the flight attitude sensor 8 through a hole 48 formed in the pendulum 36 and is firmly fixed in the panel 49. The pendulum 36 can swing about the metallic pin 37 under the action of gravity.

In FIGS. 4 and 5, the reversing "on-off" switch 38 for making, breaking and changing electric connections in an electric circuit has electric poles 38a, 38b, 38c, 38d, 38e and 38f. When the pendulum 36 is swung under the action of gravity, the brushes 42 and 43 are brought into contact with the electric poles 38a to 38f. The electric poles 38a and 38b are connected to each other through the DC source 9 when an "on-off" switch 39 is at its "on" position. The panel 49 of the flight attitude sensor 8 is vertically attached t the gondola 7 of the airship 1 at the bottom thereof and extends in the lengthwise direction of the gondola 7. Therefore, the pendulum 36 swings about the metallic pin 37 in the lengthwise direction of the gondola 7. When the attitude of the airship 1 is horizontal, the metallic brushes 42 and 43 are in contact with the electric poles 38a and 38b, respectively. In this state, i.e. in the neutral position, no electric current flows either through the vertical DC motor 10 having the propeller 11 or through the vertical DC motor 44 having the propeller 45 even when the "on-off" switch 39 is at its "on" position. Therefore, the motors 10 and 44 and propellers 11 and 45 cannot transform electric energy into mechanical power at the neutral position.

During the flight of the airship 1 at a plus angle of incidence, i.e. during the nose-up flight thereof, the pendulum 36 swings about the metallic pin 37 in the counterclockwise direction. Therefore, the metallic brush 42 comes into contact with the electric poles 38a and 38c and, at the same time, the metallic brush 43 comes into contact with the electric poles 38b and 38d. At this time, since the "on-off" switch 39 is at its "on" position, direct current flows through electric terminals 40a and 40b to the vertical DC motor 10 having the propeller 11 and through electric terminals 41a and 1b to the vertical DC motor 44 having the propeller 45, respectively. As a result, a vertical force is generated by the counterclockwise rotation of the propellers 11 and 45 to change the attitudes of the airship 1 and airplane 2 to the normal horizontal attitude due to an upward tail moment about the center of gravity of each of the airship and airplane 2.

During the flight of the airship 1 at a minus angle of incidence, i.e. during the nose-down flight thereof, the pendulum 36 swings about the metallic pin 37 in the clockwise direction. Therefore, the metallic brush 2 comes into contact with the electric poles 38a and 38e and, at the same time, the metallic brush 43 comes into contact with the electric poles 38b and 38f. At this time, since the "on-off" switch 39 is at its "on" position, direct current flows to rotate the propellers 11 and 45 of the motors 10 and 44 in the clockwise direction. As a result, a vertical force is generated to change the attitudes of the airship 1 and airplane 2 to the normal horizontal attitude due to a downward tail moment about the center of gravity Gs of the airship 1 and the center of gravity Gp of the airplane 2. Since the total of the tail moment about the center of gravity of the airship 1 and the tail moment about the center of gravity of the airplane 2 can be considered as the tail moment about the center of gravity of the aircraft as a whole, the attitude of the aircraft is changed to the normal horizontal attitude.

As has been described in the foregoing, according to the present invention, since the center Ls of the static lifting force of the airship, the center of Lp of the dynamic lifting force of the main plane of the airplane, and the center of gravity Gc of the aircraft existing between the center of gravity are on the same vertical line Gs of the airship and the center of gravity Gp of the airplane, the weight of the aircraft acts on a resultant of the static and dynamic lifting forces to avoid generating any moment precluding the flight of the aircraft. Therefore, the ascent, i.e. the takeoff, of the aircraft can be attained at the highest efficiency. The landing of the aircraft can be attained at the highest efficiency by decelerating the propellers for propulsion of the airship and airplane, lowering the speed of the aircraft and reducing the lift of the main plane. Furthermore, since the airship is provided with the flight attitude sensor, the aircraft can automatically be kept at the normal horizontal attitude at all times to make the drag of the aircraft small and the takeoff and landing distances of the aircraft short. Even during low speed or hovering flight, the aircraft can be maintained at the normal horizontal attitude by the flight attitude sensor. Thus, stable flight of the aircraft can be assured.

What is claimed is:

1. A light aircraft for short distance takeoff and landing, comprising an airplane and an airship, said airplane comprising a fuselage, an operating compartment located within said fuselage and in which said airplane is controlled, a main plane mounted on said fuselage for providing a dynamic lifting force, first propeller means provided on a rear pedestal of said fuselage for producing vertical propulsion, and means for rotating said propeller means, said airship comprising a balloon containing a buoyant gas for providing a static lifting force, a gondola provided on the lower surface of said balloon and in which said airship is controlled, supporting means for supporting and locating said airship above said fuselage of said airplane, second propeller means provided on a rear pedestal of said airship for producing vertical propulsion, means for rotating said second propeller means, and a flight attitude sensor provided within said gondola so as to be always directed in the vertical direction and adapted to transmit to said two means for rotating said first and second propeller means a first signal during nose-up flight of said balloon or a second signal during nose-down flight of said balloon.

2. A light aircraft according to claim 1, wherein said airship is located above said fuselage of said airplane so that the center of said static lifting force, the center of said dynamic lifting force and the center of the gravity of said aircraft are on the same vertical line.

3. A light aircraft according to claim 1, wherein said airship is further provided on the middle outer surface thereof with right and left propeller means for producing propulsion.

* * * * *